(12) United States Patent
Kiribuchi et al.

(10) Patent No.: US 11,967,892 B2
(45) Date of Patent: Apr. 23, 2024

(54) DC POWER SUPPLY DEVICE AND SERVO DC POWER SUPPLY SYSTEM

(71) Applicant: OMRON Corporation, Kyoto (JP)

(72) Inventors: Takeshi Kiribuchi, Kyoto (JP); Toshiyuki Zaitsu, Kyoto (JP); Takeshi Ashida, Kyoto (JP); Masashi Doi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 121 days.

(21) Appl. No.: 17/764,942

(22) PCT Filed: Mar. 5, 2020

(86) PCT No.: PCT/JP2020/009399
§ 371 (c)(1),
(2) Date: Mar. 29, 2022

(87) PCT Pub. No.: WO2021/070403
PCT Pub. Date: Apr. 15, 2021

(65) Prior Publication Data
US 2022/0352808 A1 Nov. 3, 2022

(30) Foreign Application Priority Data
Oct. 11, 2019 (JP) .................. 2019-187380

(51) Int. Cl.
*H02M 1/14* (2006.01)
*H02M 7/5387* (2007.01)
*H02P 5/74* (2006.01)

(52) U.S. Cl.
CPC ........... *H02M 1/14* (2013.01); *H02M 7/5387* (2013.01); *H02P 5/74* (2013.01)

(58) Field of Classification Search
CPC ...... H02M 1/14; H02M 7/5387; H02M 1/008; H02M 5/458; H02M 1/15; H02P 5/74; H02J 1/06
(Continued)

(56) References Cited

U.S. PATENT DOCUMENTS 4,751,442 A 6/1988 Kurakake
5,469,046 A * 11/1995 Wong .................. H02M 7/2176
323/285
(Continued)

FOREIGN PATENT DOCUMENTS

JP 84622697 B1 6/1971
JP 854128141 U 9/1979
(Continued)

OTHER PUBLICATIONS

Yokoo. "A Method to Design a Damping Control System for a Field Oriented Controlled Induction Motor Traction System for DC Electric Railway Vehicles." IEEJ Transactions on Industry Applications. 2015: 622-631. vol. 135, No. 6. English abstract provided.
(Continued)

*Primary Examiner* — Richard Tan
(74) *Attorney, Agent, or Firm* — ROSSI, KIMMS & McDOWELL LLP

(57) ABSTRACT

A DC power supply device capable of preventing voltage oscillation of a power supply path to a motor control device is provided. The DC power supply device includes a power supply unit (such as an AC/DC converter) that outputs a DC and a filter circuit that detects a voltage fluctuation of the DC output from the power supply unit and adjusts impedance of own circuit such that the voltage fluctuation of the DC is prevented based on a detection result.

4 Claims, 7 Drawing Sheets

(58) Field of Classification Search
USPC .......................................................... 307/31
See application file for complete search history.

(56) References Cited

U.S. PATENT DOCUMENTS

| | | | | |
|---|---|---|---|---|
| 5,631,812 | A * | 5/1997 | Sakano ................... | H02M 7/48 318/812 |
| 6,489,755 | B1 * | 12/2002 | Boudreaux, Jr. ....... | H02M 1/15 363/46 |
| 2019/0058323 | A1 * | 2/2019 | Sohma ................... | H02M 1/32 |

FOREIGN PATENT DOCUMENTS

| | | | |
|---|---|---|---|
| JP | S61157284 | A | 7/1986 |
| JP | H0539145 | U | 5/1993 |
| JP | H118933 | * | 1/1999 |
| JP | 2005322500 | A | 11/2005 |
| JP | 2013162719 | A | 8/2013 |
| JP | 2019030179 | A | 2/2019 |

OTHER PUBLICATIONS

International Search Report issued in Intl. Appln. No. PCT/JP2020/009399 dated May 19, 2020. English translation provided.
Written Opinion issued in Intl. Appln. No. PCT/JP2020/009399 dated May 19, 2020. English translation provided.

* cited by examiner

DC POWER SUPPLY DEVICE AND SERVO DC POWER SUPPLY SYSTEM

TECHNICAL FIELD

The present invention relates to a DC power supply device and a servo DC power supply system.

BACKGROUND ART

In a system (such as a system including a robot and a control device thereof) used in a factory and the like, a plurality of electric motors is PWM-driven by a plurality of servo drivers disposed at distant places. In the system has problems in that a switching speed cannot be increased to reduce a radiation noise from a long cable between the electric motor and the servo driver and a large number of cables are required for connection between the electric motor and the servo driver.

The above problem can be prevented by adopting a configuration in which a device (hereinafter, referred to as a motor control device) obtained by removing a converter from the servo driver is disposed in the vicinity of each electric motor to supply power from one DC power supply device to each motor control device by a DC bus. However, in the system adopting this configuration, sometimes an LC circuit on the DC bus side and the motor control device side interfere to oscillate the voltage of the DC bus (see, for example, Non-Patent Document 1).

PRIOR ART DOCUMENTS

Non-Patent Document

Non-Patent Document 1: Masashi Yokoo and Keiichiro Kondo, "Damping control system designing method for vector-controlled induction motor drive system in DC electric railway vehicle", Journal of the Institute of Electrical Engineers D, Vol. 135, No. 6 pp. 622-631 (2015)

SUMMARY OF THE INVENTION

Problems to be Solved by the Invention

The present invention has been made in view of the above problems, and an object of the present invention is to provide a technique capable of preventing voltage oscillation of a power supply path through which power is supplied to at least one motor control device.

Means for Solving the Problem

A DC power supply device according to one aspect of the present invention includes: a power supply unit configured to output a DC; and a filter circuit configured to detect a voltage fluctuation or a current fluctuation of the DC output from the power supply unit and adjust impedance of own circuit such that the voltage fluctuation or the current fluctuation of the DC is prevented based on a detection result.

The voltage of the power supply path through which the power is supplied to at least one motor control device is oscillated when the impedance on the motor side (a portion including an inverter circuit and the servomotor) is smaller than the impedance on the power supply side (the power supply path side). The DC power supply device includes the filter circuit that adjusts the impedance of the own circuit (own filter circuit) such that voltage fluctuation of output DC is prevented. Accordingly, use of the DC power supply device can prevent the voltage oscillation of the power supply path through which the power is supplied to at least one motor control device.

A specific circuit configuration of the filter circuit in the DC power supply device is not particularly limited. The filter circuit may include: a series connection body of a capacitor and a variable resistance, the series connection body being disposed between a positive-side power line and a negative-side power line from the power supply unit (for example, a circuit that converts the AC into the DC); and a controller that controls a resistance value of the variable resistance such that the voltage fluctuation of the DC is prevented based on a detection result of a voltage fluctuation of the positive-side power line or the negative-side power line. The filter circuit may include: a variable resistance inserted into a positive-side power line or a negative-side power line from the power supply unit; and a controller that controls a resistance value of the variable resistance such that the voltage fluctuation of the DC is prevented based on the detection result of the voltage fluctuation of the positive-side power line or the negative-side power line. In addition, the variable resistance of each filter circuit having this configuration may be a transistor that is controlled by the controller to operate in the active region.

Effect of the Invention

According to the present invention, the voltage oscillation of the power supply path through which the power is supplied to at least one motor control device can be prevented.

MODE FOR CARRYING OUT THE INVENTION

Hereinafter, an embodiment of the present invention will be described with reference to the drawings.

Figure 1:
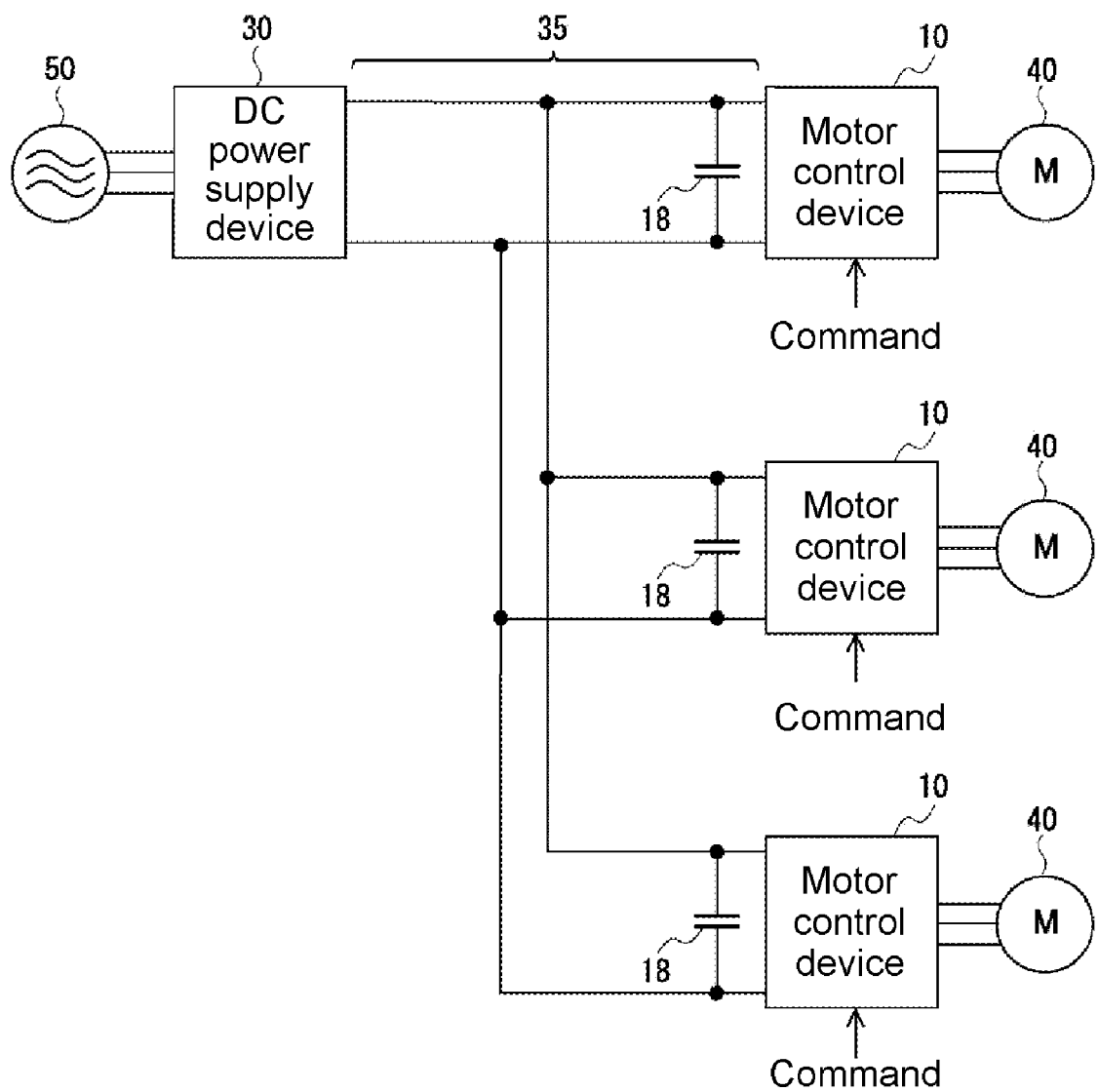
FIG. 1 is an explanatory view illustrating a schematic configuration of a servo DC feeding system according to an embodiment of the present invention.
Figure 2:
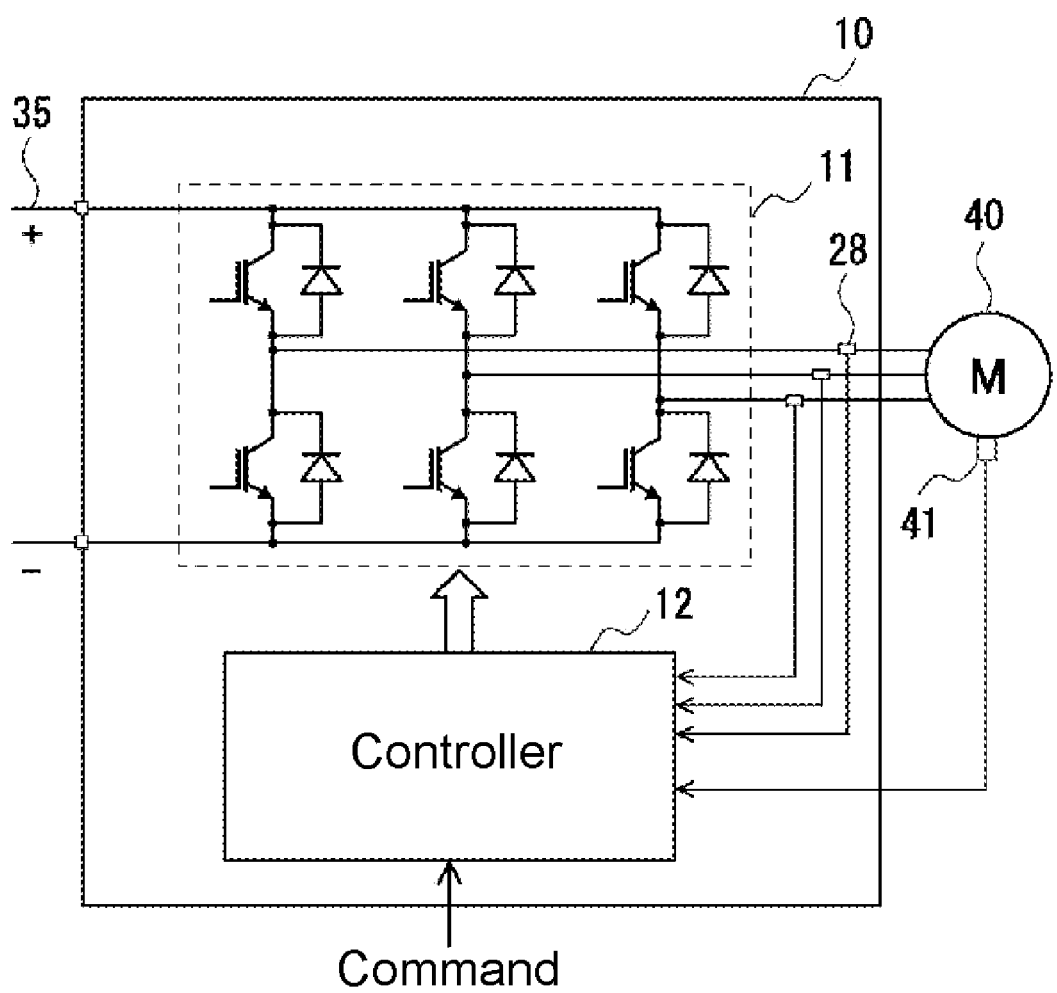
FIG. 2 is an explanatory view illustrating a schematic configuration of a motor control device in the servo DC feeding system.

FIG. 1 illustrates a schematic configuration of a servo DC feeding system according to an embodiment of the present invention, and FIG. 2 illustrates a schematic configuration of a motor control device 10 in the servo DC feeding system.

As illustrated in FIG. 1, the servo DC feeding system of the embodiment is a system in which a DC power supply device 30 and a plurality of motor control devices 10 are connected by a power supply path 35.

The DC power supply device 30 is a power supply that outputs the predetermined DC voltage. Details of the DC power supply device 30 will be described later.

The motor control device 10 is a device that controls a servomotor 40 (hereinafter, also simply referred to as a motor 40) in accordance with a command (a position command, a speed command, and the like) from a host device such as a programmable logic controller (PLC). As illustrated in FIG. 2, the motor control device 10 includes an inverter circuit 11 and a controller 12.

The inverter circuit 11 is a circuit that converts a DC voltage input from the DC power supply device 30 through the power supply path 35 into a three-phase AC. The inverter circuit 11 has a configuration in which a U-phase leg, a V-phase leg, and a W-phase leg are connected in parallel between a positive-side power line and a negative-side power line, and a current sensor 28 that measures an output current of each leg of the inverter circuit 11 is provided in the motor control device 10.

The controller 12 is a unit that performs pulse width modulation (PWM) control of the inverter circuit 11 in accordance with the command from the host device (PLC or the like). The controller 12 includes a processor (microcontroller, CPU, or the like) and a peripheral circuit of the processor, and signals from the respective current sensors 28, signals from encoders 41 (an absolute encoder and an incremental encoder) attached to the motors 40, and the like are input to the controller 12.

The power supply path 35 (FIG. 1) is a feeding path in which a plurality of power is combined such that power (current) from the DC power supply device 30 can be distributed and supplied to each motor control device 10 in the servo DC feeding system. As illustrated in FIG. 1, a smoothing capacitor 18 is usually provided at a connection portion (between power supply terminals of each motor control device 10) of the power supply path 35 to each motor control device 10.

Figure 3:
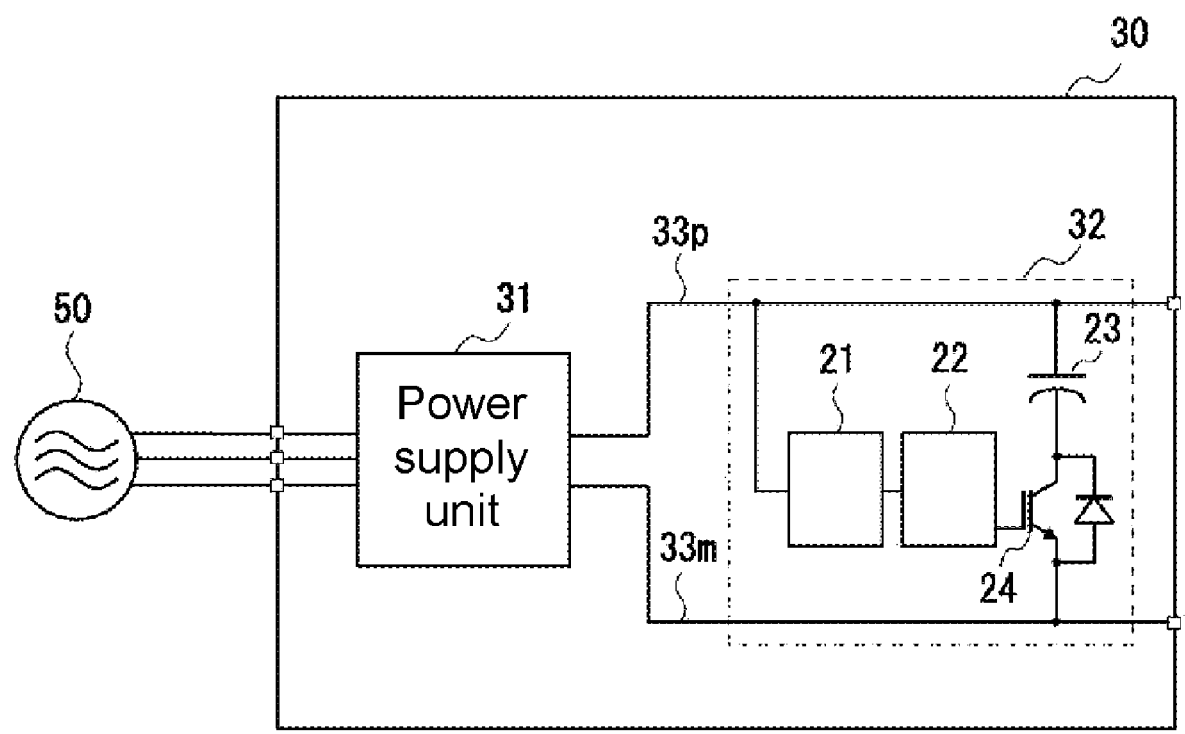
FIG. 3 is an explanatory view illustrating a schematic configuration of a DC power supply device used in the servo DC feeding system.

FIG. 3 illustrates a schematic configuration of the DC power supply device 30 used in the servo DC feeding system of the embodiment. As illustrated FIG. 3, the DC power supply device 30 includes a power supply unit 31 and a filter circuit 32.

The power supply unit 31 is a unit that outputs a predetermined DC voltage. Although FIG. 3 illustrates the unit that converts the three-phase AC from a three-phase AC power supply 50 into the DC voltage as the power supply unit 31, the power supply unit 31 may be a unit that converts the single-phase AC into the DC voltage. Furthermore, the power supply unit 31 may be a rectifier circuit (for example, a full-wave rectifier circuit) obtained by combining diodes, or an AC-DC converter (for example, a power supply regeneration converter) using a switching element. Furthermore, the power supply unit 31 may be a secondary battery.

The filter circuit 32 is a circuit that stabilizes and outputs the direct current input to own filter circuit 32. As illustrated in FIG. 3, the filter circuit 32 includes a series connection body of a capacitor 23 and a transistor 24, a vibration voltage detection circuit 21, and a drive circuit 22, which are disposed between a positive-side power line 33$p$ and a negative-side power line 33$m$ from the power supply unit 31.

The drive circuit 22 is a circuit that applies a voltage that causes the transistor 24 to operate in an active region (linear region) according to the control signal from the vibration voltage detection circuit 21 to the gate of the transistor 24.

The vibration voltage detection circuit 21 is a circuit that detects the voltage fluctuation (a voltage change amount within a predetermined time) of the power line 33$p$ and changes a level of the control signal to the drive circuit 22 in a direction in which resistance of the transistor 24 increases when the voltage fluctuation larger than or equal to a predetermined threshold is detected. The vibration voltage detection circuit 21 also has a function of changing the level of the control signal to the drive circuit 22 in accordance with the instruction from the host device, and a function of changing the level of the control signal to the drive circuit 22 in the direction in which the resistance of the transistor 24 decreases when a state in which the voltage of the power line 33$p$ is considered to be stable continues for a specified time.

The servo DC feeding system of the embodiment has the configuration described above. Consequently, according to the servo DC feeding system, the voltage oscillation of the power supply path 35 can be prevented.

Figure 4:
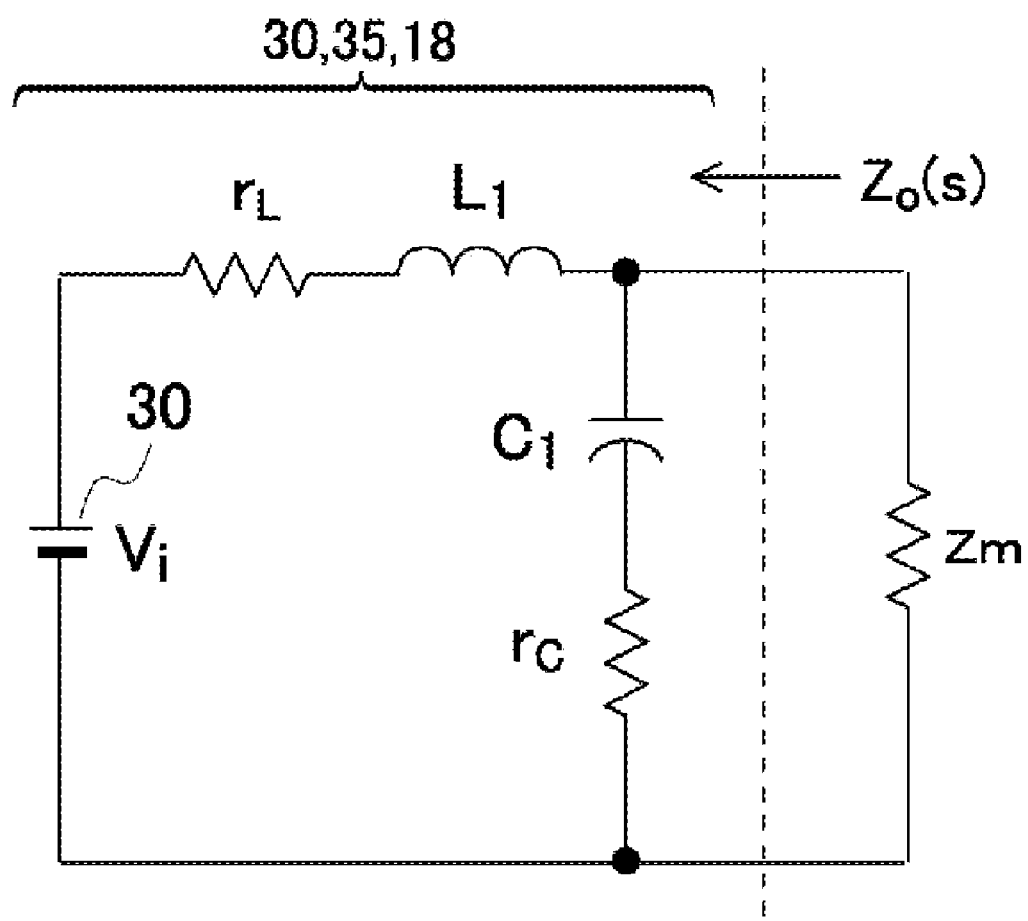
FIG. 4 is an explanatory view illustrating an equivalent circuit of the servo DC feeding system.

Specifically, when the impedance on the motor side (the portion including the plurality of motor control devices 10 and the plurality of motors 40) is expressed as Zm, the servo DC feeding system having the configuration in FIG. 1 can be expressed by the equivalent circuit in FIG. 4.

In FIG. 4, $L_1$ represents inductance of the power supply path 35, and $r_L$ represents a series resistance of $L_1$. In addition, $C_1$ is a combined capacitance of the capacitance of the power supply path 35 and the capacitance of the smoothing capacitor 18, and $r_C$ is a series resistance of $C_1$.

A peak value $Z_{0\text{-}peak}$ of the output impedance on the power supply side in the equivalent circuit (FIG. 4) is expressed by the following formula.

$$Z_{o\_peak} = \frac{L_1}{C_1(r_L + r_C)} \qquad \text{[Mathematical formula 1]}$$

Figure 5:
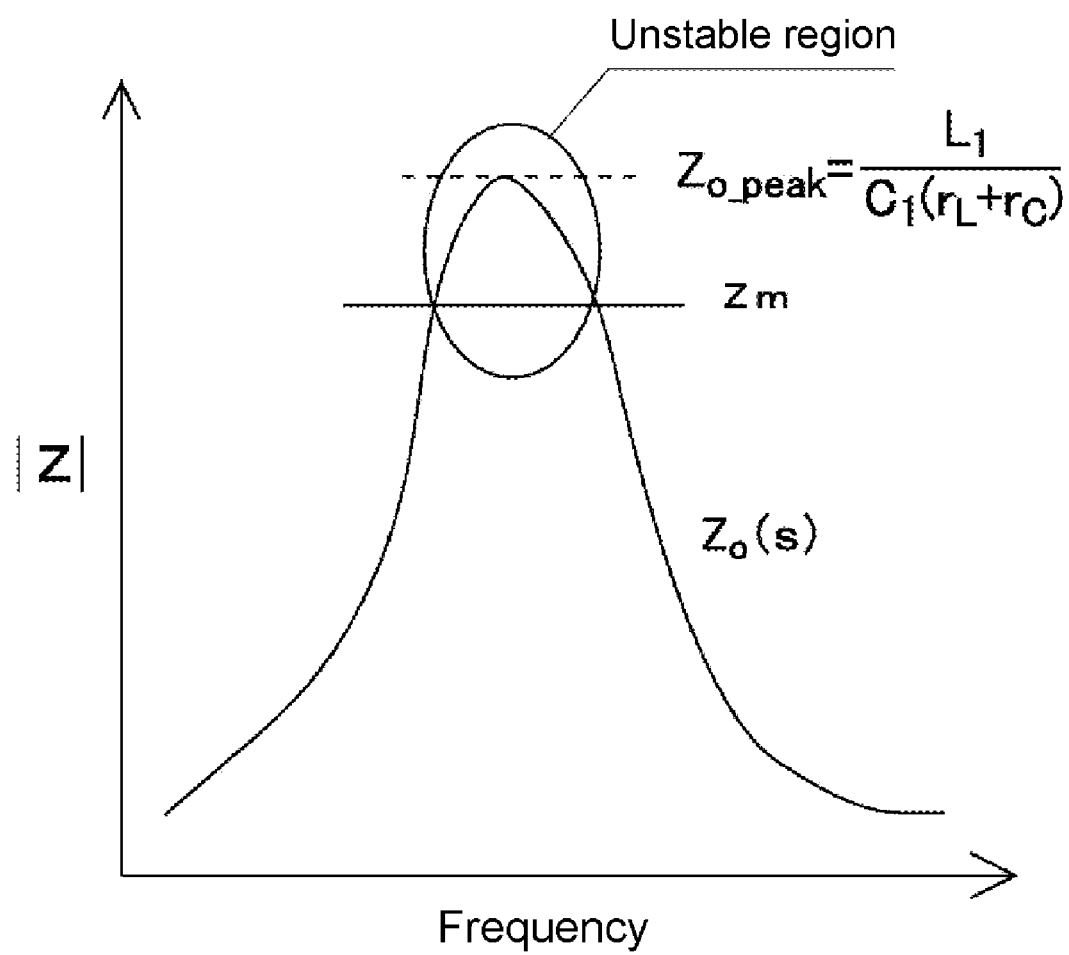
FIG. 5 is a view illustrating an unstable region of the equivalent circuit in FIG. 4.

As schematically illustrated in FIG. 5, when "$Z_{0\text{-}peak}$>Zm" holds, the voltage at the power supply path 35 becomes unstable. Accordingly, when the $Z_{0\text{-}peak}$ value is decreased, the voltage at the power supply path 35 can be prevented from becoming unstable (oscillating).

As described above, the filter circuit 32 is provided at a stage subsequent to the power supply unit 31 of the DC power supply device 30 (FIG. 3) of the servo DC feeding system.

Figure 6:
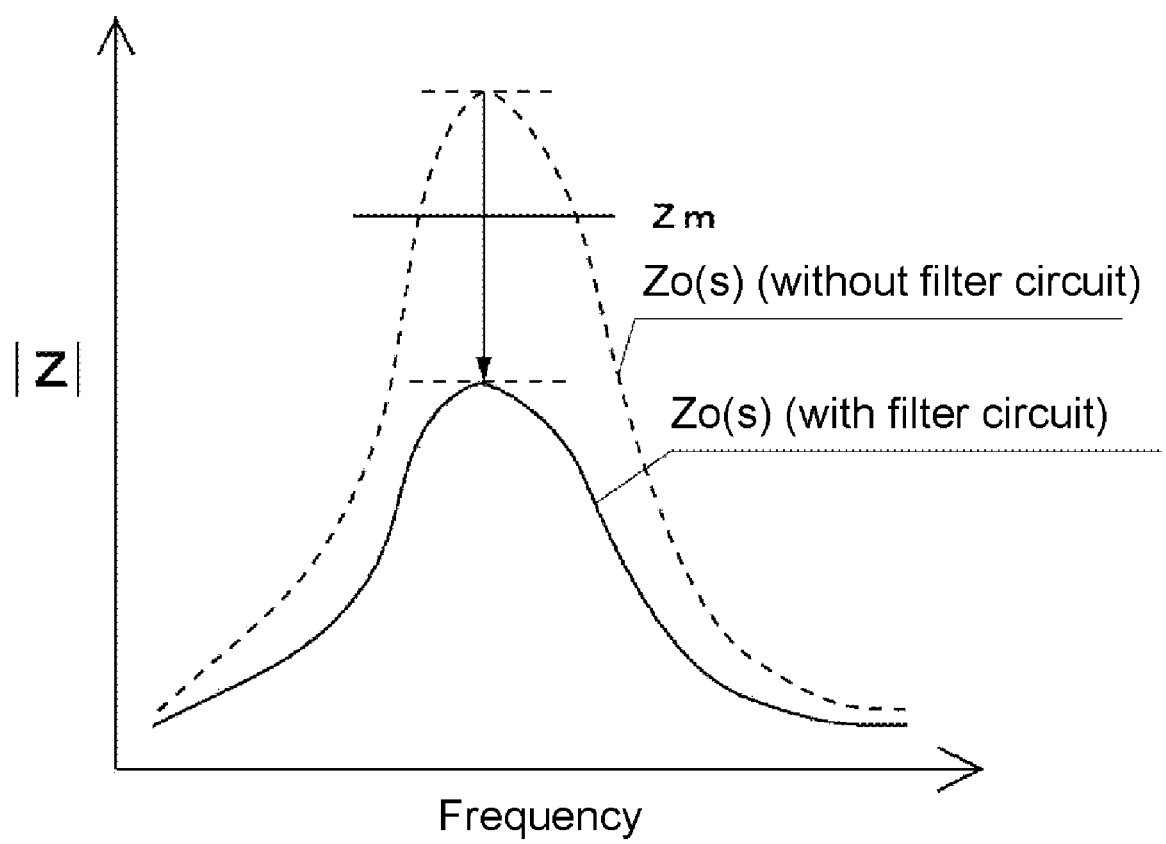
FIG. 6 is a view illustrating a function of a filter circuit.

The filter circuit 32 has a configuration in which the vibration voltage detection circuit 21 controls the resistance of the transistor 24 to a level where the voltage at the power supply path 35 is not unstable. Accordingly, in the servo DC feeding system of the embodiment, as schematically illustrated in FIG. 6, the $Z_{0\text{-}peak}$ value can be made lower than that in the system in which the DC power supply device not provided with the filter circuit 32 is used. As a result, the voltage at the power supply path 35 is prevented from becoming unstable (oscillating).

Modifications

The servo DC feeding system and the DC power supply device 30 described above can be modified in various ways. For example, the power supply path 35 of the servo DC feeding system may have a configuration different from that in FIG. 1 as long as the power (current) from the DC power supply device 30 can be supplied to all the motor control devices 10 in the servo DC feeding system. In addition, the filter circuit 32 in the DC power supply device 30 may be a circuit capable of adjusting the impedance of the own filter circuit 32 so as to prevent the voltage fluctuation of the power supply path 35. Accordingly, a plurality of resistors and a selector that inserts one of the resistors between one end of the capacitor 23 and the negative-side power line 33m may be provided instead of the transistor 24 of the filter circuit 32 (FIG. 3). In addition, a variable capacitor capable of electrically controlling the capacitance may be used instead of the capacitor 23 and the transistor 24 of the filter circuit 32.

Figure 7:
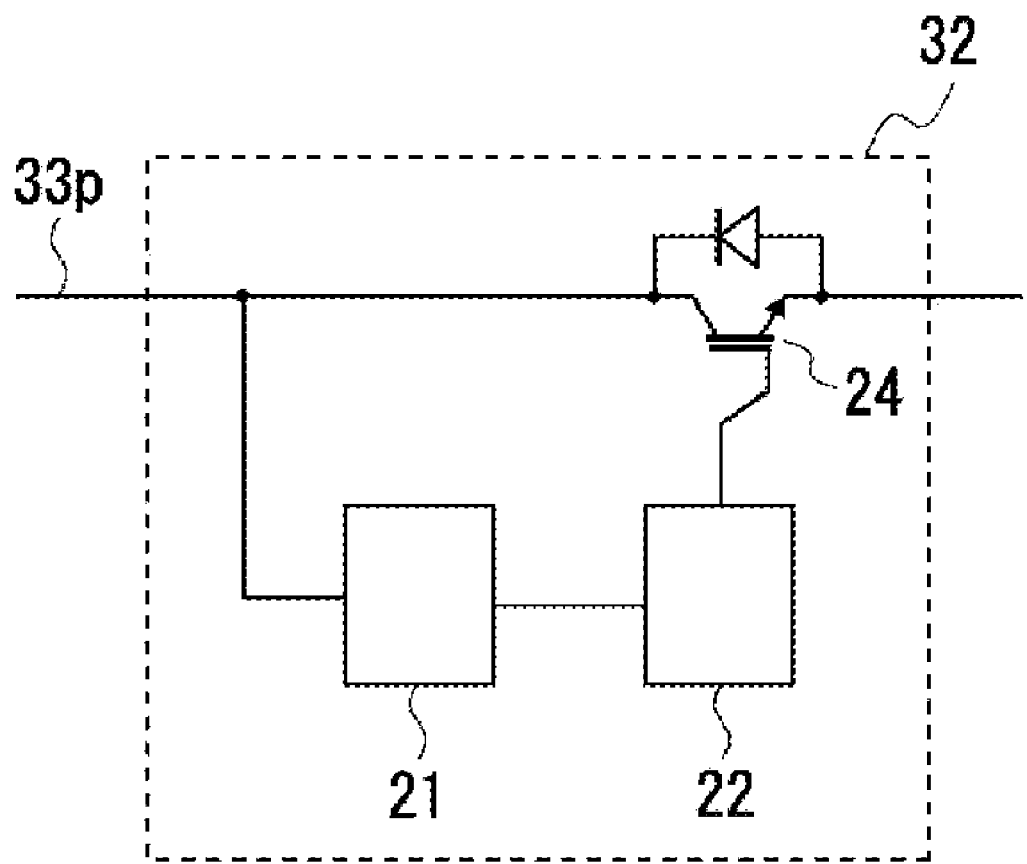
FIG. 7 is an explanatory view illustrating another configuration example of the filter circuit.

A circuit having the configuration in FIG. 7, namely, a circuit including the transistor 24 inserted into the positive-side power line 33p and the vibration voltage detection circuit 21 and the drive circuit 22 that control the resistance of the transistor 24 may be adopted as the filter circuit 32. The filter circuit 32 having the configuration in FIG. 7 may be modified to one in which the transistor 24 is inserted into the negative-side power line 33m. The circuit vibration voltage detection circuit 21 may be a circuit that detects the voltage fluctuation of the power line 33p.

The current flowing through the power supply path 35 also fluctuates during the voltage fluctuation of the power supply path 35. Because the voltage fluctuation is prevented by preventing the current fluctuation, the filter circuit 32 may be a circuit that detects the current fluctuation of the power supply path 35 and adjusts the impedance of the own circuit so as to prevent the current fluctuation. The filter circuit 32 may be a circuit in which the threshold can be set from the outside, and then the servo DC feeding system may be modified to a system that is operated while adjusting the threshold set in the filter circuit.

<Supplement 1>

A DC power supply device (10) includes: a power supply unit (31) configured to output a DC; and a filter circuit (32) configured to detect a voltage fluctuation or a current fluctuation of the DC output from the power supply unit and adjust impedance of own circuit such that the voltage fluctuation or the current fluctuation of the DC is prevented based on a detection result.

DESCRIPTION OF SYMBOLS 10 motor control device
11 inverter circuit
12 controller
18 smoothing capacitor
21 vibration voltage detection circuit
22 drive circuit
23 capacitor
24 transistor
25 inductor
28 current sensor
30 DC power supply device
31 power supply unit
32 filter circuit
33p positive-side power line
33m negative-side power line
35 power supply path
40 servomotor
41 encoder
50 three-phase AC power supply

The invention claimed is:

1. A DC power supply device comprising:
a power supply unit configured to output a DC; and
a filter circuit configured to detect a voltage fluctuation or a current fluctuation of the DC output from the power supply unit and adjust an impedance of the filter circuit, such that a further voltage fluctuation or a further current fluctuation of the DC is prevented, based on a detection result,
wherein the filter circuit includes:
a series connection body of a capacitor and a variable resistance, the series connection body being disposed between a positive-side power line and a negative-side power line from the power supply unit; and
a controller that increases a resistance value of the variable resistance when a voltage or current fluctuation of the DC is above a first threshold value and decreases the resistance value when a state in which the voltage or current fluctuation of the DC continues to be below a second threshold value, considered to be stable, for a specified time.

2. The DC power supply device according to claim 1, wherein the variable resistance is a transistor controlled by the controller so as to operate in an active region.

3. A servo DC feeding system comprising:
the DC power supply device according to claim 1;
at least one motor control device; and
a power supply path configured to supply power from the DC power supply device to the at least one motor control device.

4. A DC power supply device comprising:
a power supply unit configured to output a DC; and
a filter circuit configured to detect a voltage fluctuation or a current fluctuation of the DC output from the power supply unit and adjust an impedance of the filter circuit, such that a further voltage fluctuation or a further current fluctuation of the DC is prevented, based on a detection result,
wherein the filter circuit includes:
a variable resistance disposed in a positive-side power line or a negative-side power line from the power supply unit; and
a controller that increases a resistance value of the variable resistance when a first voltage variation of the positive-side power line or the negative-side power line is above a first threshold value and decreases the resistance value when a state in which the first voltage variation continues to be below a second threshold value, considered to be stable, for a specified time.

* * * * *

UNITED STATES PATENT AND TRADEMARK OFFICE
CERTIFICATE OF CORRECTION

| | | |
|---|---|---|
| PATENT NO. | : 11,967,892 B2 | Page 1 of 1 |
| APPLICATION NO. | : 17/764942 | |
| DATED | : April 23, 2024 | |
| INVENTOR(S) | : Takeshi Kiribuchi et al. | |

It is certified that error appears in the above-identified patent and that said Letters Patent is hereby corrected as shown below:

On the Title Page

Item (56), under FOREIGN PATENT DOCUMENTS:
-JP 84622697 B1 6/1971-, should read --JP S4622697 B1 6/1971--
-JP 854128141 U 9/1979-, should read --JP S54128141 U 9/1979--

Signed and Sealed this
Second Day of July, 2024

Katherine Kelly Vidal
*Director of the United States Patent and Trademark Office*